United States Patent [19]
Sicher

[11] Patent Number: 5,936,948
[45] Date of Patent: Aug. 10, 1999

[54] SYSTEM AND METHOD OF MULTIPLEXING DIGITIZED CALLS ON INTERSYSTEM TRANSMISSION CIRCUITS IN A RADIO TELECOMMUNICATIONS NETWORK

[75] Inventor: Alan Eric Sicher, Westmount, Canada

[73] Assignee: Telefonaktiebolaget LM Ericsson, Stockholm, Sweden

[21] Appl. No.: 08/802,116

[22] Filed: Feb. 19, 1997

[51] Int. Cl.$^6$ ................................ H04Q 7/00; H04J 3/00
[52] U.S. Cl. ..................... 370/314; 370/310; 370/345
[58] Field of Search ................................. 370/310, 395, 370/412, 431, 470, 345, 320, 321, 419, 421, 471, 314

[56] References Cited

U.S. PATENT DOCUMENTS

| | | | |
|---|---|---|---|
| 4,987,570 | 1/1991 | Almond et al. | 370/84 |
| 5,195,090 | 3/1993 | Bolliger et al. | 370/314 |
| 5,610,918 | 3/1997 | Kamo et al. | 370/395 |

*Primary Examiner*—Chi H. Pham
*Assistant Examiner*—Afsar Qureshi
*Attorney, Agent, or Firm*—Smith & Danamrai, P.C.

[57] ABSTRACT

A system and method of multiplexing a plurality of digitized data and packetized voice calls on an intersystem transmission circuit in a radio telecommunication system having a plurality of mobile switching centers (MSCs) connected by intersystem transmission circuits having a fixed bandwidth. Frame relay techniques are utilized to create a plurality of variable length frames for transporting data for the calls. A plurality of logical links are then associated with the intersystem transmission circuit, and the frames are logically connected to logical links associated with the intersystem transmission circuit. A frame handler in each MSC statistically multiplexes a plurality of the logical links on the intersystem transmission circuit by determining a combination of packetized voice and data frames that utilizes the highest percentage of the fixed bandwidth of the intersystem transmission circuit, queuing frames as necessary, and multiplexing the determined combination of voice and data frames on the intersystem transmission circuit utilizing a Data Link Connection Identifier (DLCI) address field to multiplex a plurality of logical frame relay connections over the intersystem transmission circuit.

18 Claims, 2 Drawing Sheets

SYSTEM AND METHOD OF MULTIPLEXING DIGITIZED CALLS ON INTERSYSTEM TRANSMISSION CIRCUITS IN A RADIO TELECOMMUNICATIONS NETWORK

BACKGROUND OF THE INVENTION

1. Technical Field of the Invention

This invention relates to radio telecommunication systems and, more particularly, to a system and method of statistically multiplexing a plurality of digitized data or packetized voice calls on one or more intersystem transmission circuits utilizing frame relay techniques.

2. Description of Related Art

Existing radio telecommunications networks are capable of supporting circuit-mode data services within the framework of existing air interface technologies such as, for example, Time Division Multiple Access (TDMA) and Code Division Multiple Access (CDMA). In order to support circuit-mode data services and packetized voice services, an interworking function (IWF) is added to the anchor Base Station (BS) or anchor Mobile Switching Center (MSC) (i.e., the system on which the call initially sets up). The IWF translates between the specialized digital radio link protocols and fixed landline-based modems, terminals, and facsimile machines. The IWF assigned to a particular call to a mobile station remains fixed in the anchor MSC as the mobile station hands off to other serving systems. This supports seamless operation and eliminates the need to pass complex call-state information as the mobile station moves from one MSC to another.

In order to facilitate the implementation of the IWF in the anchor system, an Intersystem Link Protocol (ISLP) transports data frames over an E-interface between a serving MSC and an anchor MSC, and rate adapts the radio link protocol rate to intersystem facility rates, for example 64 kbps Digital Stream 0 (DS0). An ISLP is currently being standardized in PN3660 for the intersystem signaling standard IS-41 (ANSI-41) by a EIA/TIA TR45.2 working group, and the ballot has been approved. The PN3660-ISLP is applicable to the TDMA (IS-136) Digital Advanced Mobile Phone System (D-AMPS) and to CDMA (IS-95) systems as well. The PN3660-ISLP merely frames higher level Radio Link Protocol (RLP) frames and performs inter-frame fill utilizing High-Level Datalink Control (HDLC)-based flags. This process is described in PN3660 and call delivery and handoff signaling additions to ANSI-41 described in PN3770, both of which are hereby incorporated by reference herein. The GSM system also has an ISLP which performs similar functions based on the ITU standard V.110. The GSM-ISLP is described in GSM 04.21 version 4.6.0 which is hereby incorporated by reference herein.

Neither the PN3660-ISLP nor the GSM-ISLP support multiplexing of a plurality of calls on a single intersystem transmission circuit. Therefore, both the PN3660-ISLP and the GSM-ISLP require one intersystem trunk per intersystem data call.

Although there are no known prior art teachings of a solution to the aforementioned deficiency and shortcoming such as that disclosed herein, U.S. Pat. No. 4,987,570 to Almond et al. (Almond) discusses subject matter that bears some relation to matters discussed herein. Almond discloses a method and apparatus for performing time-interleaved, multiplexed rate adaptation for sub-rate channels in a digital communication system. Almond improves bandwidth utilization by packaging sub-rate channel data into fragment-size envelopes of smaller size than the channel capacity which are then time-interleaved on available channels to improve the system's bandwidth usage. Almond performs time-interleaved multiplexed rate adaptation with a fragment size ideally equal to the granularity of the system's switch. For example, a 2.048 Mb (non-multiplexed) channel is divided into 32 slots of 64 Kb each. Each slot contains eight fragments of 8 Kb, the smallest channel size that can be switched through the system.

However, Almond addresses only landline communications, and does not teach or suggest a method of multiplexing a plurality of data calls on multiple intersystem transmission circuits in a radio telecommunication system. Additionally, Almond does not suggest the use of frame relay which permits variable length fragments to be utilized, nor does Almond suggest statistical multiplexing on the channel.

Review of each of the foregoing references reveals no disclosure or suggestion of a system or method such as that described and claimed herein.

In order to overcome the disadvantage of existing solutions, it would be advantageous to have an intersystem link protocol which enables multiple data calls to be placed on the same trunk. By utilizing frames of variable length and statistically multiplexing the channels, most, if not all, of the available bandwidth is utilized. Such a protocol would provide a more efficient intersystem (inter-MSC) transport protocol capable of supporting circuit-mode data services such as Asynchronous Data Services (ADS), Group 3 Facsimile (G3 Fax), and packetized voice. The present invention provides such a protocol.

SUMMARY OF THE INVENTION

In one aspect, the present invention is a method of multiplexing a plurality of digitized calls on a fixed-bandwidth intersystem transmission circuit between mobile switching centers (MSCs) in a radio telecommunication system. The method begins by creating a plurality of variable length frames for transporting data for the calls, and logically connecting the frames to logical links associated with the intersystem transmission circuit. This is followed by statistically multiplexing a pluralilty of the logical links on the intersystem transmission circuit.

In another aspect, the present invention is a method of multiplexing a plurality of digitized calls on an intersystem transmission circuit in a radio telecommunication system having a plurality of mobile switching centers (MSCs) connected by intersystem transmission circuits having a fixed bandwidth. The method begins by utilizing frame relay techniques to create a plurality of variable length frames for transporting data for the calls. A plurality of logical links are then associated with the intersystem transmission circuit, and the frames are logically connected to logical links associated with the intersystem transmission circuit. This is followed by statistically multiplexing a pluralilty of the logical links on the intersystem transmission circuit. The multiplexing step includes determining a combination of voice and data frames that utilizes the highest percentage of the fixed bandwidth of the intersystem transmission circuit, queuing the frames, and multiplexing the determined combination of voice and data frames on the intersystem transmission circuit utilizing a Data Link Connection Identifier (DLCI) address field to multiplex a plurality of logical frame relay connections over the intersystem transmission circuit.

In yet another aspect, the present invention is a system in a radio telecommunications network having a plurality of mobile switching centers (MSCs) connected by intersystem transmission circuits having a fixed bandwidth. The system multiplexes a plurality of digitized calls on one of the intersystem transmission circuits between a first MSC and a second MSC. The system includes frame relay means for creating a plurality of variable length frames for transporting data for the calls, logic means within each of the plurality of MSCs for logically connecting the frames to logical links associated with the intersystem transmission circuit, and a frame handler within each of the plurality of MSCs for statistically multiplexing a pluralilty of the logical links on the intersystem transmission circuit.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
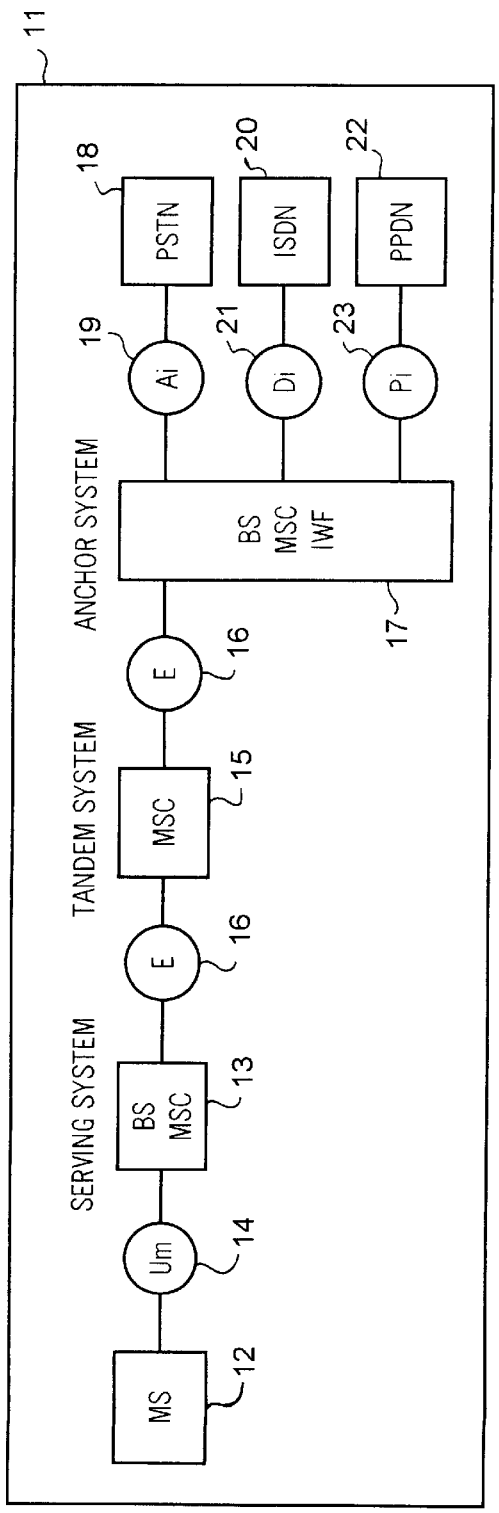
FIG. 1 (Prior Art) is a block diagram of a simplified network reference model 11 for a radio telecommunications network suitable for implementing the present invention.

FIG. 1 is a block diagram of a simplified network reference model 11 for a radio telecommunications network suitable for implementing the present invention. A mobile station (MS) 12 is connected to a serving system 13 comprising a base station (BS) and a mobile switching center (MSC) via a BS-to-MS interface (Um) 14, also known as the air interface. The serving system 13 is connected to a tandem system 15 via a MSC-to-MSC interface (E) 16. The tandem system 15 is connected to an anchor system 17 comprising a MSC, a BS, and an IWF via the MSC-to-MSC interface (E) 16. The IWF may be implemented in either the anchor MSC or the anchor BS. The anchor system 17 is connected to the Public Switched Telephone System (PSTN) 18 via a MSC-to-PSTN interface ($A_i$) 19. The anchor system 17 is connected to the Integrated Services Digital Network (ISDN) 20 via a MSC-to-ISDN interface ($D_i$) 21. The anchor system 17 is connected to the Public Packet Data Network (PPDN) 22 via a MSC-to-PPDN interface ($P_i$) 23.

In existing networks, circuit-mode data services require one intersystem trunk per data call. The circuit-mode data services transport data via the (Um) 14 and (E) 16 interfaces between the MS 12 and the IWF in the anchor system 17. Circuit-mode data services also transport data via the ($A_i$) 19, ($D_i$) 21, and ($P_i$) 23 interfaces between the IWF in the anchor system 17 and the PSTN 18, the ISDN 20, or the PPDN 22.

Figure 2:
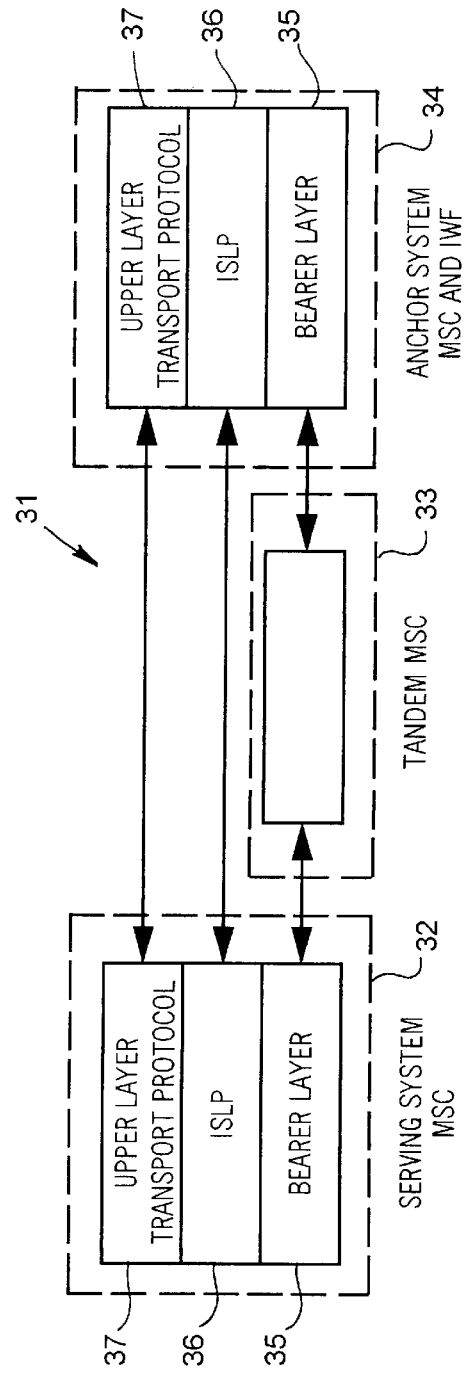
FIG. 2 (Prior Art) is an illustrative drawing illustrating the relationship between the layers of an intersystem communications protocol profile utilizing a simple prior art intersystem link protocol (ISLP)

FIG. 2 is an illustrative drawing illustrating the relationship between the layers of an intersystem communications protocol profile 31 utilizing a simple prior art intersystem link protocol (ISLP). There is illustrated a Serving System MSC 32, a Tandem System MSC 33, and an Anchor System MSC and IWF 34. The protocol profile 31 includes a bearer layer 35, an ISLP layer 36, and an upper layer transport protocol layer 37. The upper layer transport protocol may be Radio Link Protocol-1 (RLP-1) in IS-130, or Transport Control Protocol/Internet Protocol/Point-to-Point Protocol (TCP/IP/PPP) in IS-99. The bearer layer 35 may be acted upon by the tandem MSC 33, however, the ISLP layer 36 and the RTP layer 37 essentially pass through the tandem MSC unaffected.

The present invention includes a rate adaptation protocol (Type 2 ISLP) which utilizes frame relay techniques to multiplex a plurality of digitized data or packetized voice calls on one or more intersystem transmission circuits. Frame relay techniques are known in the art and are specified in ANSI T1.606, T1.617, and T1.618; and CCITT/ITU-T Q933, Q370, I233, I370, and Q922 which are hereby incorporated by reference herein. The Type 2 ISLP of the present invention may be utilized to replace the PN3660-ISLP and the GSM-ISLP to rate adapt the radio link protocol rate to a plurality of intersystem facility rates. If a particular trunk is operating at, for example 64 kbps Digital Stream 0 (DS0), and a data call requires only 10 kbps, then the prior art ISLPs waste 54 kbps bandwidth since they can only place one data call on each trunk. The present invention enables multiple data calls to be placed on the same trunk, thereby utilizing most, if not all, of the available bandwidth. Thus, the present invention provides a more efficient intersystem (inter-MSC) transport protocol capable of supporting circuit-mode data services such as Asynchronous Data Services (ADS) and Group 3 Facsimile (G3 Fax) as specified in IS-99 and PN3676 (for CDMA) and IS-130/135 (for TDMA). IS-99, PN3676, IS-130, and IS-135 are hereby incorporated by reference herein.

By utilizing frame relay, the present invention provides a number of other advantages including:

Supports statistical multiplexing of multiple logical links per channel using the Data Link Connection Identifier (DLCI) address field;

No additional parameter overhead or procedures (for example, control field, sequence numbers, flow control, etc.);

Supports variable frame lengths and simple congestion management; and

Supports migration of PN3660-ISLP; only a Frame Check Sequence (FCS) and DLCI address field need to be added to the data frame.

Thus, the rate adaptation protocol of the present invention enables simple rate adaptation for circuit-mode data services such as, for example, ADS and G3 Fax. The present invention may also provide link-to-link independence, and may be utilized between a serving system and an anchor system, possibly through one or more tandem systems.

An ISLP Info parameter is utilized to indicate whether an ISLP protocol is to be used, and if so, whether to use the existing Type 1 ISLP or the Type 2 ISLP of the present invention. An exemplary ISLP Info parameter is defined in the table below. The ISLP Info parameter is passed in the intersystem handoff messages Facilities Directive, Handoff Back, and Handoff to Third. The ISLP Info parameter is also passed in the in-call service change messages Change Service and Change Facilities. The ISLP Info parameter is disabled after a Facilities Release.

| Parameter | Usage | Type |
|---|---|---|
| ISLPInfo | Circuit mode intersystem link protocol supported. Encoded as:<br>    0 No ISLP supported<br>    1 ISLP Type 1 supported<br>    2 ISLP Type 2 supported<br>    3–223 Reserved. Treat the same as value 0.<br>    224–255 Reserved for IS-41 protocol extension. If unknown, treat the same as value 0. | R |

Figure 3:
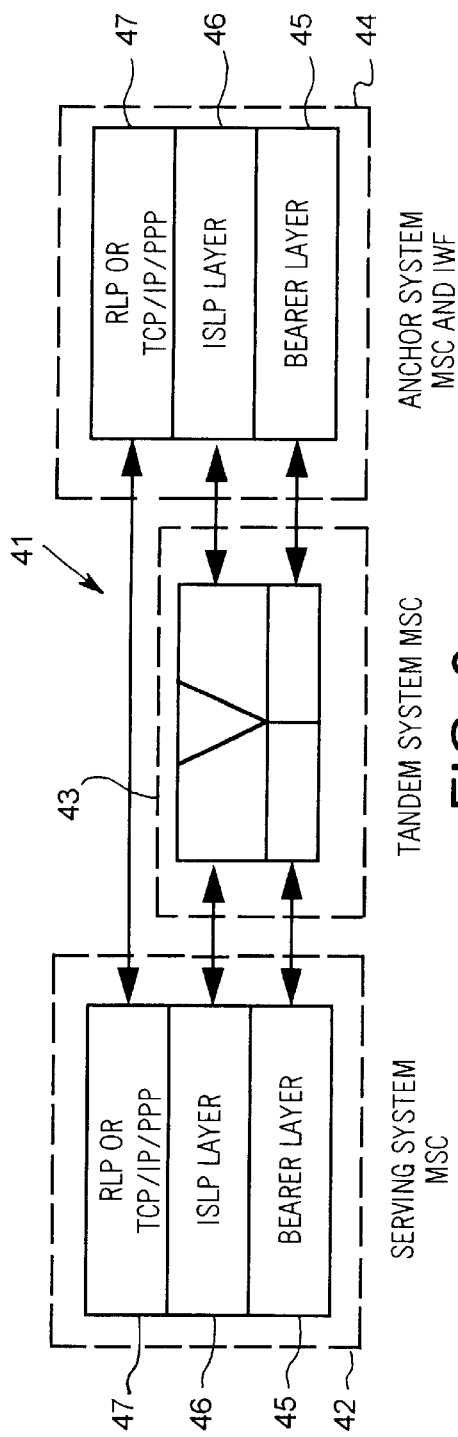
FIG. 3 is an illustrative drawing illustrating the relationship between the layers of an intersystem communications protocol profile utilizing the multiplexing ISLP of the present invention for circuit-mode data services.

FIG. 3 is an illustrative drawing illustrating the relationship between the layers of an intersystem communications protocol profile 41 for Asynchronous Data Services/Group 3 Facsimile (ADS/G3 Fax), and including the present invention as the ISLP Layer. There is illustrated a Serving system MSC 42, a Tandem System MSC 43, and an Anchor System MSC and IWF 44. The protocol profile includes a bearer layer 45, an ISLP layer 46, and an upper layer transport protocol 47 such as RLP-1 or TCP/IP/PPP. Unlike the simple ISLP layer illustrated in FIG. 2, the ISLP layer of the present invention is relayed by a frame handling function 64 (FIG. 5) in the tandem MSC 43, and some conversion may take place. For example, if two calls enter the tandem system MSC 43 from the serving system MSC 42, the tandem system MSC 43 may insert additional traffic from another source, and three or more calls may exit the tandem MSC for the anchor system MSC 44.

Figure 4:
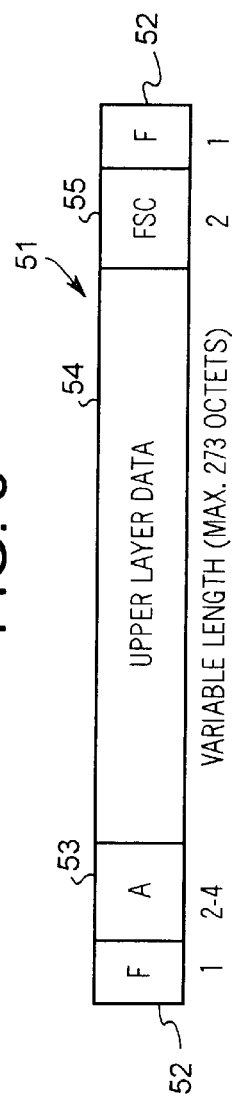
FIG. 4 is an illustrative drawing of a basic frame relay structure for the rate adaptation protocol of the present invention.

FIG. 4 is an illustrative drawing of a basic frame relay structure 51 for the rate adaptation protocol of the present invention. There are framing bits 52 at the front end and back end of the frame relay 51. An address field "A" 53 has a default length of 2 octets. The address field includes the Data Link Connection Identifier (DLCI) and a plurality of specialized flags. The DLCI is similar in function to a X.25 virtual circuit number and allows multiple logical frame relay connections to be multiplexed over a single channel. "DLCI=0" is reserved for in channel call control. A payload 54 of upper layer data is of variable length, with a maximum length of 273 octets. A Frame Check Sequence (FCS) 55 as in Link Access Protocol-D (LAPD) and Link Access Protocol-B (LAPB) is also included. In addition to zero insertion, framing and rate adaptation via flag stuffing, the present invention supports additional error detection through a two octet Cyclic Redundancy Check (CRC).

Figure 5:
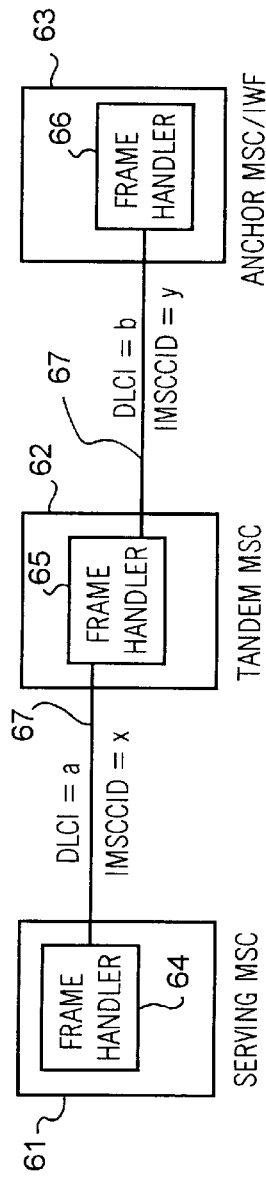
FIG. 5 is a simplified block diagram of the connections required to pass the ISLP type and Data Link Connection Identifier (DLCI) between an anchor MSC, a tandem MSC, and a serving MSC.

FIG. 5 is a simplified block diagram of the connections required to pass the ISLP type and DLCI between a serving MSC 61, a tandem MSC 62, and an anchor MSC 63. In addition to specifying the ISLP type (in the ISLP Info parameter), the present invention specifies the DLCI to be associated on a logical link between two MSCs. FIG. 3 illustrates the use of the DLCI and the link-by-link independence. The serving MSC 61 includes a frame handler 64. The tandem MSC 62 may include a frame handler 65. The anchor MSC 63 includes a frame handler 66. Frame handlers 64 and 66 include logic which maps Data Link Connection Identifiers (DLCIs) to Inter-MSC Identifiers IMSCCIDs and queues frames as necessary for multiplexing on the intersystem circuit 67. The tandem MSC frame handler 65 includes logic which maps each incoming DLCI and IMSC-CID with an outgoing DLCI/IMSCCID, and queues frames as necessary prior to statistically multiplexing them on the intersystem circuit 67. The IMSCCID is a parameter in ANSI-41 which is a logical identity of a MSC-to-MSC trunk. Several logical links may have an association with a single IMSCCID in a multiplexing scenario.

The present invention statistically multiplexes a pluralilty of logical links on a single intersystem transmission circuit by determining the combination of voice and/or data calls that utilizes the highest percentage of the fixed bandwidth of the intersystem transmission circuit. This combination is then multiplexed over the intersystem transmission circuit. In the preferred embodiment, the calls are multiplexed by utilizing the DLCI address field to multiplex a plurality of logical frame relay connections over the intersystem transmission circuit.

Compatibility with the simple flag-stuffing ISLP protocol of PN3660 may be achieved with the frame relay structure of the present invention by specifying a unique DLCI address to denote a simple ISLP frame. This also informs the receiving frame handler (MSC) that, by definition, only one logical connection is to be carried by the inter-MSC channel. The FCS does not have to be computed, and the FCS field may be ignored on the receiving end.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunication system having a plurality of mobile switching centers (MSCs), a method of multiplexing a plurality of digitized data and packetized voice calls on an intersystem transmission circuit between a first MSC and a second MSC after digital-to-digital handoff of a mobile station between the MSCs, said method comprising the steps of:

connecting the first MSC and the second MSC by an intersystem transmission circuit having a fixed bandwidth;

creating a plurality of variable length frames for transporting data for calls handed off between the first and second MSCs;

logically connecting said frames to logical links associated with said intersystem transmission circuit, said connecting step including:

mapping within each MSC, Data Link Connection Identifiers (DLCIs) to ANSI-41 Inter-MSC Identifiers; and queuing frames as necessary for multiplexing on the intersystem transmission circuit; and statistically multiplexing a pluralilty of said logical links on said intersystem transmission circuit.

2. The method of claim 1 wherein said step of creating a plurality of variable length frames includes utilizing frame relay techniques to create said plurality of variable length frames.

3. The method of claim 2 further comprising the steps of:

utilizing an intersystem link protocol (ISLP) for communicating between said first MSC and said second MSC, said ISLP supporting statistical multiplexing of variable length frames; and sending a message, whenever said ISLP is to be utilized, from said first MSC to said second MSC indicating that said ISLP and rate adaptation is to be utilized.

4. The method of claim 3 wherein said step of sending a message from said first MSC to said second MSC indicating that said ISLP and rate adaptation is to be utilized includes the steps of:

including an ISLP parameter in intersystem handoff messages and in-call service change messages, said ISLP parameter indicating that a frame relay inter-MSC handoff technique is being utilized rather than a non-statistically multiplexed technique; and setting said ISLP parameter to indicate which type of ISLP is to be utilized.

5. The method of claim 4 wherein the step of including an ISLP parameter in intersystem handoff messages and in-call service change messages includes sending the ISLP parameter in an ANSI-41 message selected from the group consisting of:

Facilities Directive message;

Handoff Back message;

Handoff-to-Third message;

Change Service message; and

Change Facilities message.

6. The method of claim 2 further comprising, before the step of logically connecting said frames to logical links, the step of associating a plurality of logical links with said intersystem transmission circuit.

7. The method of claim 2 wherein said step of statistically multiplexing a pluralilty of said logical links on said intersystem transmission circuit includes:

determining a combination of packetized voice and data frames that utilizes the highest percentage of the fixed bandwidth of said intersystem transmission circuit; and multiplexing said determined combination of voice and data frames on said intersystem transmission circuit.

8. In a radio telecommunication system having a plurality of mobile switching centers (MSCs), a method of multiplexing a plurality of digitized data and packetized voice calls on an intersystem transmission circuit between a first MSC and a second MSC after digital-to-digital handoff of a mobile station between the MSCs, said method comprising the steps of:

connecting the first MSC and the second MSC by an intersystem transmission circuit having a fixed bandwidth;

utilizing frame relay techniques to create a plurality of variable length frames for transporting data for calls handed off between the first and second MSCs;

associating a plurality of logical links with said intersystem transmission circuit;

logically connecting said frames to logical links associated with said intersystem transmission circuit, said connecting step including:

mapping within each MSC, Data Link Connection Identifiers (DLCIs) to ANSI-41 Inter-MSC Identifiers; and queuing frames as necessary for multiplexing on the intersystem transmission circuit; and statistically multiplexing a pluralilty of said logical links on said intersystem transmission circuit, said multiplexing step comprising:

determining a combination of voice and data frames that utilizes the highest percentage of the fixed bandwidth of said intersystem transmission circuit; and multiplexing said determined combination of voice and data frames on said intersystem transmission circuit utilizing a DLCI address field to multiplex a plurality of logical frame relay connections over said intersystem transmission circuit.

9. The method of claim 8 further comprising the steps of:

utilizing an intersystem link protocol (ISLP) for communicating between said first MSC and said second MSC, said ISLP supporting statistical multiplexing of variable length frames; and sending a message, whenever said ISLP is to be utilized, from said first MSC to said second MSC indicating that rate adaptation is to be utilized and which type of ISLP is to be utilized.

10. The method of claim 9 wherein said step of sending a message from said first MSC to said second MSC indicating that said ISLP is to be utilized includes the step of including an ISLP parameter in intersystem handoff messages and in-call service change messages, said ISLP parameter indicating that a frame relay inter-MSC handoff technique is being utilized rather than a non-statistically multiplexed technique.

11. The method of claim 8 wherein said step of multiplexing said determined combination of voice and data frames on said intersystem transmission circuit includes utilizing a Data Link Connection Identifier (DLCI) address field to multiplex a plurality of logical frame relay connections over said intersystem transmission circuit.

12. The method of claim 8 wherein said step of multiplexing said determined combination of voice and data frames on said intersystem transmission circuit includes queuing, at said first MSC and said second MSC, selected frames until said queued frames can be multiplexed on said intersystem transmission circuit.

13. In a radio telecommunications network having a plurality of mobile switching centers (MSCs) connected by intersystem transmission circuits having a fixed bandwidth, a system for multiplexing a plurality of digitized data and packetized voice calls on one of said intersystem transmission circuits between a first MSC and a second MSC after digital-to-digital handoff of a mobile station between the MSCs, said system comprising:

frame relay means for creating a plurality of variable length frames for transporting data for calls handed off between the first and second MSCs; p1 logic means within each of said plurality of MSCs for logically connecting said frames to logical links associated with said intersystem transmission circuit, said logic means including:

means for mapping Data Link Connection Identifiers (DLCIs) to ANSI-41 Inter-MSC Identifiers; and means for queuing frames as necessary for multiplexing on the intersystem transmission circuit; and a frame handler within each of said plurality of MSCs for statistically multiplexing a pluralilty of said logical links on said intersystem transmission circuit.

14. The system of claim 13 further comprising:

an intersystem link protocol (ISLP) for communicating between said first MSC and said second MSC, said ISLP supporting statistical multiplexing of variable length frames; and means for sending a message, whenever said ISLP is to be utilized, from said first MSC to said second MSC indicating that said ISLP and rate adaptation is to be utilized.

15. The system of claim 14 wherein said means for sending a message from said first MSC to said second MSC indicating that said ISLP and rate adaptation is to be utilized includes means for setting an ISLP parameter in intersystem handoff messages and in-call service change messages, said ISLP parameter indicating that a frame relay inter-MSC handoff technique is being utilized rather than a non-statistically multiplexed technique, and indicating which type of ISLP is to be utilized.

16. The system of claim 15 wherein the means for setting an ISLP parameter in intersystem handoff messages and in-call service change messages includes means for setting the ISLP parameter in an ANSI-41 message selected from the group consisting of:

Facilities Directive message;

Handoff Back message;

Handoff-to-Third message;

Change Service message; and

Change Facilities message.

17. The system of claim 14 wherein said logic means includes means for associating a plurality of logical links with said intersystem transmission circuit.

18. The system of claim 14 wherein said frame handler includes:

means for determining a combination of packetized voice and data frames that utilizes the highest percentage of the fixed bandwidth of said intersystem transmission circuit; and means for multiplexing said determined combination of voice and data frames on said intersystem transmission circuit.

* * * * *